United States Patent
Seong et al.

(10) Patent No.: US 10,944,286 B2
(45) Date of Patent: Mar. 9, 2021

(54) APPARATUS AND METHOD FOR CONTROLLING CONVERTER OF ECO-FRIENDLY VEHICLE

(71) Applicants: HYUNDAI MOTOR COMPANY, Seoul (KR); KIA MOTORS CORPORATION, Seoul (KR)

(72) Inventors: Hyun Wook Seong, Hwaseong-si (KR); Dong Gyun Woo, Suwon-si (KR); Gi Bong Son, Hwaseong-si (KR); Hui Sung Jang, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 129 days.

(21) Appl. No.: 16/115,093

(22) Filed: Aug. 28, 2018

(65) Prior Publication Data
US 2019/0252897 A1    Aug. 15, 2019

(30) Foreign Application Priority Data

Feb. 14, 2018    (KR) .......................... 10-2018-0018499

(51) Int. Cl.
  *H02J 7/00*    (2006.01)
  *H02J 7/35*    (2006.01)
  (Continued)

(52) U.S. Cl.
  CPC .............. *H02J 7/35* (2013.01); *H01M 10/42* (2013.01); *H02J 1/102* (2013.01); *H02J 7/007* (2013.01);
  (Continued)

(58) Field of Classification Search
  CPC ........ H02J 2207/40; H02J 1/102; H02J 7/007; H02J 7/34; H02J 7/35; H01M 10/42
  (Continued)

(56) References Cited

U.S. PATENT DOCUMENTS 6,064,937 A  *  5/2000  Yang .......................... B60L 8/00
                                                        701/93
7,446,505 B2 * 11/2008  Paul .................... G01R 31/3842
                                                        320/132

(Continued)

FOREIGN PATENT DOCUMENTS

| JP | 2007245763 A | * | 9/2007 |
| JP | 2014-023211 A | | 2/2014 |
| KR | 10-2013-0063893 A | | 6/2013 |

OTHER PUBLICATIONS

Extended European Search Report issued in corresponding European Patent Application No. 18191014.2 dated Nov. 12, 2018.

*Primary Examiner* — John T Trischler
(74) *Attorney, Agent, or Firm* — Morgan, Lewis & Bockius LLP

(57) ABSTRACT

An apparatus for controlling a converter of an eco-friendly vehicle includes: a high-voltage battery; a low-voltage conversion converter configured to convert power supplied from the high-voltage battery into a low voltage to provide power to at least one of an auxiliary battery of the vehicle and an electric load thereof; a renewable energy generator configured to generate power using renewable energy including solar light; a renewable energy conversion converter configured to convert the power supplied from the renewable energy generator to provide power to the at least one of the auxiliary battery and the electric load; and a controller configured to control an output voltage value of the low-voltage conversion converter and an output current of the renewable energy conversion converter.

7 Claims, 6 Drawing Sheets

US 10,944,286 B2

Page 2

(51) Int. Cl.
*H02J 1/10* (2006.01)
*H01M 10/42* (2006.01)
*H02J 7/34* (2006.01)
*B60L 1/00* (2006.01)

(52) U.S. Cl.
CPC . *H02J 7/34* (2013.01); *B60L 1/00* (2013.01); *B60L 2210/10* (2013.01); *B60L 2240/547* (2013.01); *H01M 2220/20* (2013.01); *H02J 2207/40* (2020.01)

(58) Field of Classification Search
USPC .................................. 320/104, 103, 101
See application file for complete search history.

(56) References Cited

U.S. PATENT DOCUMENTS

| | | | | |
|---|---|---|---|---|
| 8,476,870 | B2* | 7/2013 | Labrunie | H02J 7/0029 |
| | | | | 320/132 |
| 8,482,255 | B2* | 7/2013 | Crombez | H01M 10/44 |
| | | | | 320/132 |
| 8,805,629 | B2* | 8/2014 | Yin | H02S 40/34 |
| | | | | 702/63 |
| 9,118,191 | B2* | 8/2015 | Jung | H02J 7/0086 |
| 9,156,359 | B2* | 10/2015 | Atluri | B60L 1/00 |
| 9,172,259 | B2* | 10/2015 | Hwang | H02J 3/32 |
| 9,306,443 | B2* | 4/2016 | Liu | H02M 1/08 |
| 9,373,964 | B2* | 6/2016 | Subramaniam | H02M 1/4225 |
| 9,385,582 | B2* | 7/2016 | Zheng | H02M 1/00 |
| 9,599,675 | B2* | 3/2017 | Yun | G01R 31/3842 |
| 9,641,124 | B2* | 5/2017 | Eo | H02S 20/30 |
| 9,821,668 | B2* | 11/2017 | Kusch | B60L 58/26 |
| 9,935,465 | B2* | 4/2018 | Inoue | H02J 3/381 |
| 9,944,189 | B2* | 4/2018 | Jung | B60L 58/15 |
| 9,972,983 | B2* | 5/2018 | Park | H02S 10/40 |
| 10,052,967 | B2* | 8/2018 | Saucke | H02J 7/342 |
| 10,105,937 | B2* | 10/2018 | Kim | H01L 31/18 |
| 10,347,952 | B2* | 7/2019 | Choi | H01M 10/482 |
| 10,399,442 | B2* | 9/2019 | Harada | B60L 3/0084 |
| 10,570,654 | B2* | 2/2020 | Song | H02S 40/34 |
| 2008/0238371 | A1* | 10/2008 | Tamezane | G01R 31/3828 |
| | | | | 320/134 |
| 2010/0085063 | A1* | 4/2010 | Lebrunie | H02J 7/0029 |
| | | | | 324/537 |
| 2010/0198424 | A1* | 8/2010 | Takehara | H01L 31/02021 |
| | | | | 700/298 |
| 2012/0004874 | A1* | 1/2012 | Yin | H02S 40/34 |
| | | | | 702/63 |
| 2012/0049792 | A1* | 3/2012 | Crombez | H01M 10/44 |
| | | | | 320/109 |
| 2012/0075898 | A1* | 3/2012 | Sigamani | G05F 1/67 |
| | | | | 363/131 |
| 2012/0109554 | A1* | 5/2012 | Lin | H01M 10/0525 |
| | | | | 702/63 |
| 2012/0133322 | A1* | 5/2012 | Walsh | H01L 31/048 |
| | | | | 320/101 |
| 2012/0193986 | A1* | 8/2012 | Easwaran | G05F 1/67 |
| | | | | 307/63 |
| 2013/0049698 | A1* | 2/2013 | Jung | H02J 7/0016 |
| | | | | 320/134 |
| 2013/0118556 | A1* | 5/2013 | Kim | H01L 31/022466 |
| | | | | 136/249 |
| 2013/0144547 | A1* | 6/2013 | Yun | G01R 31/3842 |
| | | | | 702/63 |
| 2013/0307339 | A1* | 11/2013 | Subramanium | H02M 1/4225 |
| | | | | 307/66 |
| 2013/0320911 | A1* | 12/2013 | Kamiya | B60L 53/22 |
| | | | | 320/101 |
| 2013/0342154 | A1* | 12/2013 | Yamamoto | H02J 7/35 |
| | | | | 320/101 |
| 2014/0008983 | A1* | 1/2014 | Miyauchi | H01L 31/02021 |
| | | | | 307/52 |
| 2014/0008986 | A1* | 1/2014 | Miyauchi | H02M 3/1584 |
| | | | | 307/82 |
| 2014/0077757 | A1* | 3/2014 | Liu | H02J 3/385 |
| | | | | 320/107 |
| 2014/0095018 | A1 | 4/2014 | Atluri et al. | |
| 2014/0145678 | A1* | 5/2014 | Hwang | H02J 7/0016 |
| | | | | 320/118 |
| 2014/0159478 | A1* | 6/2014 | Ang | B60L 8/003 |
| | | | | 307/9.1 |
| 2014/0174506 | A1* | 6/2014 | Kim | B60J 7/043 |
| | | | | 136/251 |
| 2015/0070024 | A1* | 3/2015 | Kim | H01M 10/48 |
| | | | | 324/430 |
| 2015/0115714 | A1* | 4/2015 | Ferrarons | H02J 4/00 |
| | | | | 307/23 |
| 2015/0175021 | A1* | 6/2015 | Kim | B60L 58/20 |
| | | | | 320/109 |
| 2015/0183328 | A1* | 7/2015 | Kusch | B60L 58/26 |
| | | | | 320/109 |
| 2015/0188401 | A1* | 7/2015 | Zheng | H02M 1/00 |
| | | | | 363/95 |
| 2015/0295412 | A1* | 10/2015 | Schiffmann | H01L 31/02021 |
| | | | | 307/31 |
| 2016/0121738 | A1* | 5/2016 | Jung | B60L 8/003 |
| | | | | 701/22 |
| 2016/0121824 | A1* | 5/2016 | Song | H01L 31/0201 |
| | | | | 136/256 |
| 2016/0126385 | A1* | 5/2016 | Kim | H01L 31/0488 |
| | | | | 136/251 |
| 2016/0126886 | A1* | 5/2016 | Eo | H02S 20/30 |
| | | | | 296/216.04 |
| 2016/0159230 | A1* | 6/2016 | Song | H01L 31/056 |
| | | | | 180/2.2 |
| 2016/0185237 | A1* | 6/2016 | Ha | B60L 1/00 |
| | | | | 318/139 |
| 2016/0229167 | A1* | 8/2016 | Kim | H01L 31/18 |
| 2016/0233828 | A1* | 8/2016 | Hwang | H01L 41/113 |
| 2016/0261206 | A1* | 9/2016 | Ayai | H02M 3/04 |
| 2016/0268890 | A1* | 9/2016 | Ayai | H02M 3/156 |
| 2016/0329716 | A1* | 11/2016 | Inoue | H02M 7/44 |
| 2017/0015205 | A1* | 1/2017 | Ahn | B60L 11/02 |
| 2017/0054134 | A1* | 2/2017 | Choi | H02J 7/0013 |
| 2017/0070081 | A1* | 3/2017 | Cher | H02S 40/38 |
| 2017/0166079 | A1 | 6/2017 | Saucke et al. | |
| 2017/0187193 | A1* | 6/2017 | Fujii | H02J 3/385 |
| 2017/0267113 | A1 | 9/2017 | Harada | |
| 2017/0359016 | A1* | 12/2017 | Kim | H02S 20/26 |
| 2018/0102634 | A1* | 4/2018 | Park | B60J 7/043 |
| 2018/0291516 | A1* | 10/2018 | Nakao | C25B 1/04 |
| 2018/0358832 | A1* | 12/2018 | Son | B60L 58/20 |
| 2019/0112855 | A1* | 4/2019 | Song | H02S 20/30 |
| 2019/0127867 | A1* | 5/2019 | Yonezawa | C25B 15/02 |
| 2019/0181646 | A1* | 6/2019 | Fathy | H01M 10/46 |
| 2019/0207414 | A1* | 7/2019 | Park | B60L 53/63 |
| 2019/0329661 | A1* | 10/2019 | Yum | B60L 58/13 |
| 2019/0366956 | A1* | 12/2019 | Kim | B60R 16/03 |
| 2020/0144956 | A1* | 5/2020 | Zhang | H02S 10/20 |

* cited by examiner

APPARATUS AND METHOD FOR CONTROLLING CONVERTER OF ECO-FRIENDLY VEHICLE

CROSS REFERENCE TO RELATED APPLICATION

The present application claims priority to Korean Patent Application No. 10-2018-0018499, filed Feb. 14, 2018, the entire contents of which is incorporated herein for all purposes by this reference.

TECHNICAL FIELD

The present disclosure relates to an apparatus and A method for controlling a converter of an eco-friendly vehicle, and more particularly, to an apparatus and a method for controlling a converter of an eco-friendly vehicle, capable of controlling a low-voltage conversion converter and a renewable energy conversion converter for converting power generated.

BACKGROUND

Generally, an eco-friendly vehicle includes a high-voltage battery for supplying driving power and an auxiliary battery for supplying power to an electric load. When the voltage of the auxiliary battery does not exceed a reference value under the control of a host controller, a low-voltage DC-DC converter (LDC) connected to the auxiliary battery and the electric load lowers the voltage of the high-voltage battery to charge the auxiliary battery.

In order to improve the fuel efficiency of the vehicle, research for applying technology including solar power generation and thermoelectric power generation to generate power using renewable energy to the eco-friendly vehicle is actively being conducted. In this way, in the eco-friendly vehicle to which energy generated through the renewable energy is applied, a renewable energy conversion converter is required to use the power generated through the renewable energy to charge the battery of the vehicle or to drive the electric load thereof.

However, conventionally, in the eco-friendly vehicle to which the LDC and the renewable energy conversion converter are applied, when the LDC and the renewable energy conversion converter are operated simultaneously, a phenomenon in which the load current tends to be diverted to the converter having a large output voltage occurs. More specifically, when the load current is diverted to the LDC, it is impossible to transfer the energy generated through the renewable energy, and when the load current is diverted to the renewable energy conversion converter, an excessive current flows to the renewable energy conversion converter so that the output is limited. That is, conventionally, there is a limit in that the output of the LDC and the output of the renewable energy conversion converter cannot be used simultaneously.

SUMMARY

The present disclosure has been made in order to solve the above-mentioned problems in the prior art and an aspect of the present disclosure is to provide an apparatus and method for controlling a converter of an eco-friendly vehicle, which may control an output voltage of a low-voltage conversion converter and an output current of a renewable energy conversion converter to simultaneously use the output of the low-voltage conversion converter and the output of the renewable energy conversion converter and thereby may further improve the fuel efficiency of the vehicle.

In accordance with an aspect of the present disclosure, an apparatus for controlling a converter of an eco-friendly vehicle includes: a high-voltage battery; a low-voltage conversion converter configured to convert power supplied from the high-voltage battery into a low voltage to provide power to at least one of an auxiliary battery of the vehicle and an electric load thereof; a renewable energy generator configured to generate power using renewable energy including solar light; a renewable energy conversion converter configured to convert the power supplied from the renewable energy generator to provide power to the at least one of the auxiliary battery and the electric load; and a controller configured to control an output voltage value of the low-voltage conversion converter and an output current of the renewable energy conversion converter.

Here, the apparatus may further include a database configured to store open circuit voltage information for each charging state of the auxiliary battery and power information generated from the renewable energy generator.

The controller may control the output voltage of the low-voltage conversion converter to be an open circuit voltage corresponding to a target charging state of the auxiliary battery based on the information stored in the database.

The controller may derive maximum power amount information generated from the renewable energy generator based on information stored in the database and current and voltage values input to the renewable energy conversion converter based on the generated maximum power amount information, and may derive a target output current of the renewable energy conversion converter using the derived current and voltage values and the output voltage value of the low-voltage conversion converter.

The controller may cause the output current of the renewable energy conversion converter to reach the target output current of the renewable energy conversion converter.

The controller may cause an output current of the low-voltage conversion converter and the output current of the renewable energy conversion converter to be simultaneously provided to the auxiliary battery until the auxiliary battery reaches a target charging state.

The controller may cause an operation of the renewable energy conversion converter to be stopped after the auxiliary battery reaches the target charging state.

The controller may cause at least one of the low-voltage conversion converter and the renewable energy conversion converter to be operated during stopping or traveling of the vehicle.

In accordance with another aspect of the present disclosure, a method for controlling a converter of an eco-friendly vehicle includes: setting an output voltage value of a low-voltage conversion converter to an open circuit voltage corresponding to a target charging state of an auxiliary battery; deriving maximum power amount information generated from a renewable energy generator based on information stored in a database and current and voltage values input to a renewable energy conversion converter based on the generated maximum power amount information, and deriving a target output current of the renewable energy conversion converter using the derived current and voltage values and the output voltage value of the low-voltage conversion converter; and increasing an output current of the renewable energy conversion converter to reach the target output current of the renewable energy conversion converter.

Here, the method may further include causing an output current of the low-voltage conversion converter and the output current of the renewable energy conversion converter to be simultaneously provided to the auxiliary battery until the auxiliary battery reaches the target charging state; and causing an operation of the renewable energy conversion converter to be stopped after the auxiliary battery reaches the target charging state.

According to the present disclosure, it is possible to simultaneously use the output of the low-voltage conversion converter and the output of the renewable energy conversion converter by controlling the output voltage of the low-voltage conversion converter and the output current of the renewable energy conversion converter, thereby further improving the fuel efficiency of the vehicle.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Hereinafter, an apparatus and method for controlling a converter of an eco-friendly vehicle according to one aspect of embodiments of the present disclosure will be described with reference to the accompanying drawings.

Figure 1:
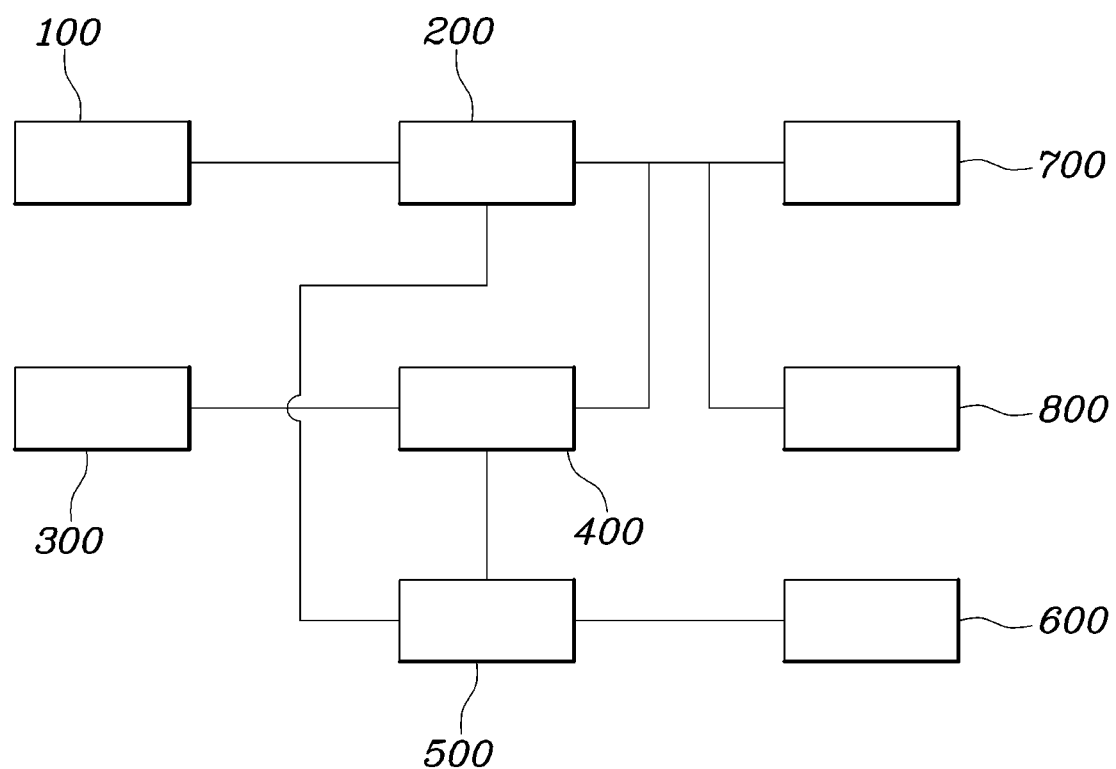
FIG. 1 is a schematic diagram illustrating the overall configuration of an apparatus for controlling a converter of an eco-friendly vehicle according to an embodiment of the present disclosure.
Figure 2:
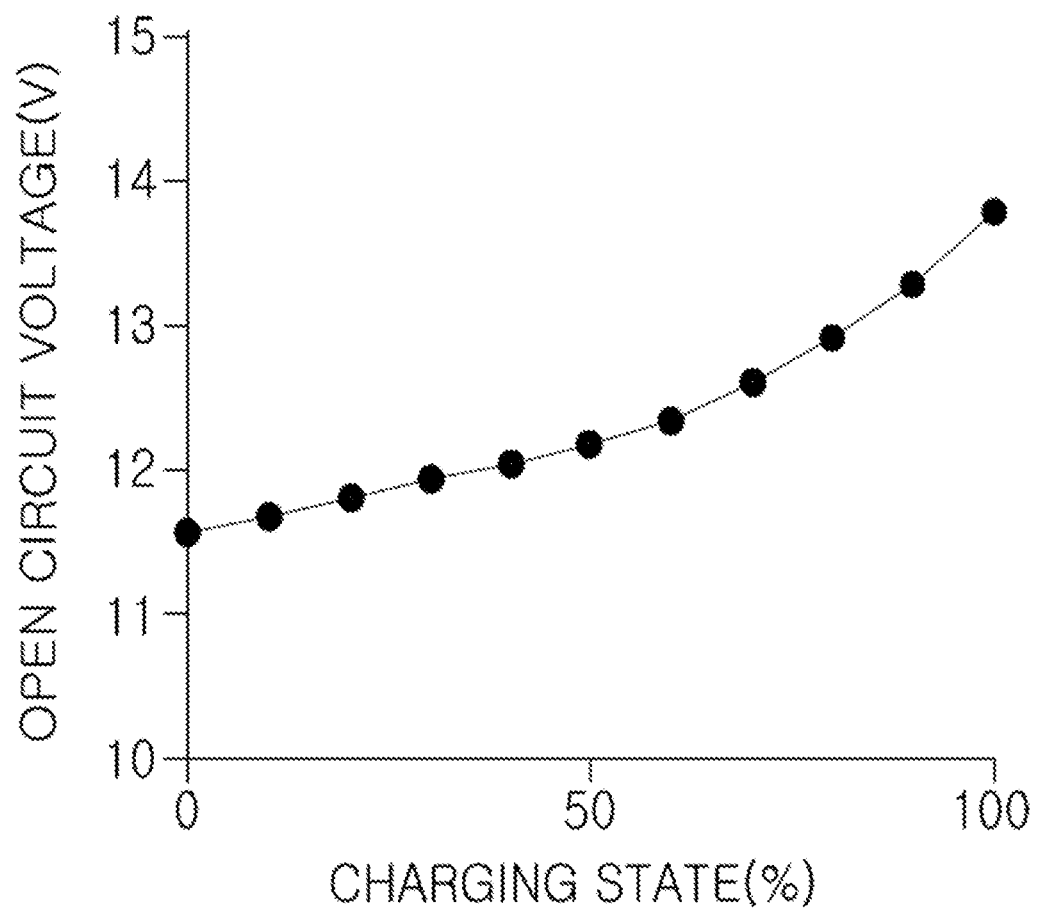
FIG. 2 is a diagram illustrating open circuit voltage information for each charging state of an auxiliary battery stored in a database, in an apparatus for controlling a converter of an eco-friendly vehicle according to an embodiment of the present disclosure.
Figure 3:
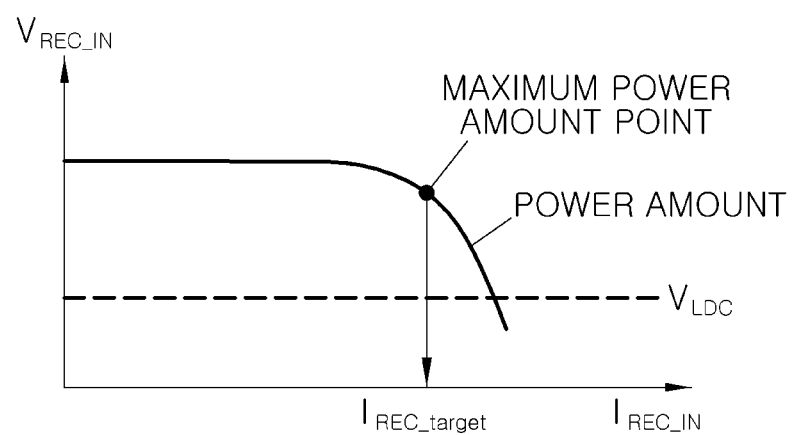
FIG. 3 is a diagram illustrating power information generated from a renewable energy generator stored in a database, in an apparatus for controlling a converter of an eco-friendly vehicle according to an embodiment of the present disclosure.
Figure 4:
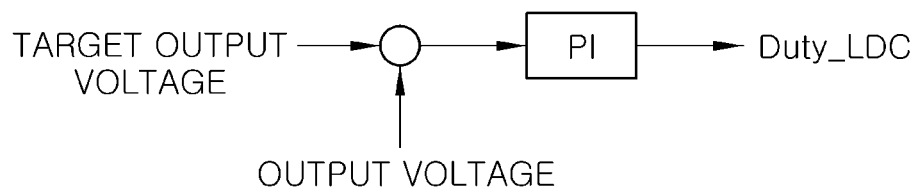
FIG. 4 is a diagram illustrating a case in which a controller controls the output voltage of a low-voltage conversion converter to be a target output voltage, in an apparatus for controlling a converter of an eco-friendly vehicle according to an embodiment of the present disclosure.
Figure 5:
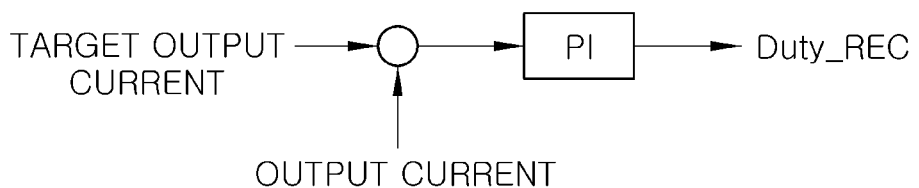
FIG. 5 is a diagram illustrating a case in which a controller controls the output current of a renewable energy conversion converter to be a target output current, in an apparatus for controlling a converter of an eco-friendly vehicle according to an embodiment of the present disclosure.

FIG. 1 is a schematic diagram illustrating the overall configuration of an apparatus for controlling a converter of an eco-friendly vehicle according to an embodiment of the present disclosure, FIG. 2 is a diagram illustrating open circuit voltage information for each charging state of an auxiliary battery stored in a database, FIG. 3 is a diagram illustrating power information generated from a renewable energy generator stored in a database, FIG. 4 is a diagram illustrating a case in which a controller controls the output voltage of a low-voltage conversion converter to be a target output voltage, and FIG. 5 is a diagram illustrating a case in which a controller controls the output current of a renewable energy conversion converter to be a target output current.

As illustrated in FIG. 1, an apparatus for controlling a converter of an eco-friendly vehicle according to an embodiment of the present disclosure includes a high-voltage battery 100, a low-voltage conversion converter 200, a renewable energy generator 300, a renewable energy conversion converter 400, and a controller 500, and may further include a database 600 according to the embodiment. Hereinafter, a detailed configuration of the apparatus for controlling the converter of the eco-friendly vehicle according to an embodiment of the present disclosure will be described in more detail.

The high-voltage battery 100 serves as an energy supply source that supplies power for driving a motor to a high-output large-capacity battery, charges an auxiliary battery, and supplies power to an electric load of the vehicle. Here, the high-voltage battery 100 may include a plurality of battery cells, and may have a sum of the total output voltage of the respective battery cells as an output voltage thereof, thereby outputting high-voltage power of several hundred volts or more.

The low-voltage conversion converter 200 serves to convert the power supplied from the high-voltage battery 100 into a low voltage in order to provide power to at least one of an auxiliary battery 800 and an electric load 700 of the vehicle. For example, when the auxiliary battery 800 and the electric load 700 of 12V in the vehicle are used, the low-voltage conversion converter 200 reduces the high-voltage power supplied from the high-voltage battery 100 to a voltage of 12V to provide the reduced voltage to the auxiliary battery 800 and the electric load 700. Here, the electric load 700 may include a battery and a generator The renewable energy generator 300 serves to generate power using renewable energy including solar light. According to the embodiment, the renewable energy generator 300 may generate energy using solar light by a solar roof or the like installed on the upper portion of the vehicle, and according to another embodiment, may generate energy through thermoelectric power generation or the like. The power generated by the renewable energy generator 300 may be used to charge the battery of the vehicle or to drive the electric load or the like thereof.

The renewable energy conversion converter 400 serves to convert the power supplied from the renewable energy generator in order to provide power to at least one of the auxiliary battery and the electric load of the vehicle. That is, the renewable energy conversion converter 400 converts the voltage and provides the converted voltage in such a manner that the power generated by the renewable energy generator 300 conforms to the specifications of the auxiliary battery 800 and the electric load 700 used in the vehicle.

The controller 500 serves to control the output current of the low-voltage conversion converter 200 and the output current of the renewable energy conversion converter 400. Through such control, the controller 500 causes the output current of the low-voltage conversion converter 200 and the output current of the renewable energy conversion converter 400 to be provided simultaneously in order to charge the auxiliary battery 800 of the vehicle, thereby further improving the fuel efficiency of the vehicle.

The database 600 may store open circuit voltage information for each charging state of the auxiliary battery and power information generated from the renewable energy generator.

FIG. 2 is a diagram illustrating open circuit voltage information for each charging state of the auxiliary battery stored in the database, FIG. 3 is a diagram illustrating power information generated from the renewable energy generator stored in the database. Referring to FIG. 2, the horizontal axis represents the charging state of the auxiliary battery, and the vertical axis represents an open circuit voltage when the auxiliary battery is in a corresponding charging state. For example, when the charging state is 50%, the open circuit voltage of the auxiliary battery is about 12V. When the charging state is 100%, the open circuit voltage of the auxiliary battery is about 14V.

In addition, the database 600 may include the power information generated from the renewable energy generator 300 as illustrated in FIG. 3. Here, the power information may include an amount of the power generated by the renewable energy generator 300 and voltage and current values input to the renewable energy conversion converter 400 based on the amount of the generated power. Referring to FIG. 3, the graph curve represents power generated by the renewable energy generator 300, and the horizontal axis and the vertical axis represent current and voltage values input to the renewable energy conversion converter 400 according to the amount of the generated power.

As described above, the database 600 stores the open circuit voltage information for each charging state of the auxiliary battery and the power information generated from the renewable energy generator, and the controller 500 may control the output of each of the low-voltage conversion converter 200 and the renewable energy conversion converter 400 using the information stored in the database 600. Hereinafter, the characteristics of the controller 500 that causes the output current of the low-voltage conversion converter 200 and the output current of the renewable energy conversion converter 400 to be simultaneously provided to the auxiliary battery 800 of the vehicle will be described in more detail.

First, as illustrated in FIG. 4, the controller 500 may control the output voltage of the low-voltage conversion converter 200 to be the open circuit voltage corresponding to a target charging state of the auxiliary battery 800 based on the information stored in the database 600. According to the embodiment, the controller 500 may cause the output voltage of the low-voltage conversion converter 200 to reach the open circuit voltage corresponding to the target charging state of the auxiliary battery 800 through a proportional integral control method. For example, when the target charging state of the auxiliary battery 800 is set to 100%, the open circuit voltage of the auxiliary battery 800 in the corresponding charging state is about 14V as illustrated in FIG. 4. Accordingly, the controller 500 may control the low-voltage conversion converter 200 so that the high voltage supplied from the high-voltage battery 100 is reduced to 14V to be output. In this manner, when the target charging state of the auxiliary battery 800 is set, the controller 500 may control the low-voltage conversion converter 200 in such a manner that the high voltage supplied from the high-voltage battery 110 is reduced to the open circuit voltage corresponding to the target charging state of the auxiliary battery 800 based on the information stored in the database 600. In FIG. 4, Duty_LCD denotes duty that allows an output voltage of the low-voltage conversion converter to reach a target output voltage.

When the output voltage of the low-voltage conversion converter 200 reaches the open circuit voltage corresponding to the target charging state of the auxiliary battery 800, the controller 500 may derive maximum power amount information generated from the renewable energy generator 300 based on the information stored in the database 600 and the current and voltage values input to the renewable energy conversion converter 400 according to the generated maximum power amount information, and may derive a target output voltage of the renewable energy conversion converter 400 using the derived current and voltage values and the output voltage value of the low-voltage conversion converter 200. At this time, since the renewable energy conversion converter 400 is a step-down type converter, the voltage value input to the renewable energy conversion converter 400 may be larger than the output voltage value of the low-voltage conversion converter 200. Here, the output voltage of the low-voltage conversion converter 200 may be a value that reaches the open circuit voltage corresponding to the target charging state of the auxiliary battery 800.

In addition, as illustrated in FIG. 5, the controller 500 may control the output current of the renewable energy conversion converter 400 to reach the target output current based on the derived target output current value. According to the embodiment, as illustrated in FIG. 5, the controller 500 may control the output current of the renewable energy conversion converter 400 to reach the target output current through a proportional integral control method. In FIG. 5, Duty_REC denotes duty that allows an output current of the renewable energy conversion converter to reach a target output current.

Figure 6:
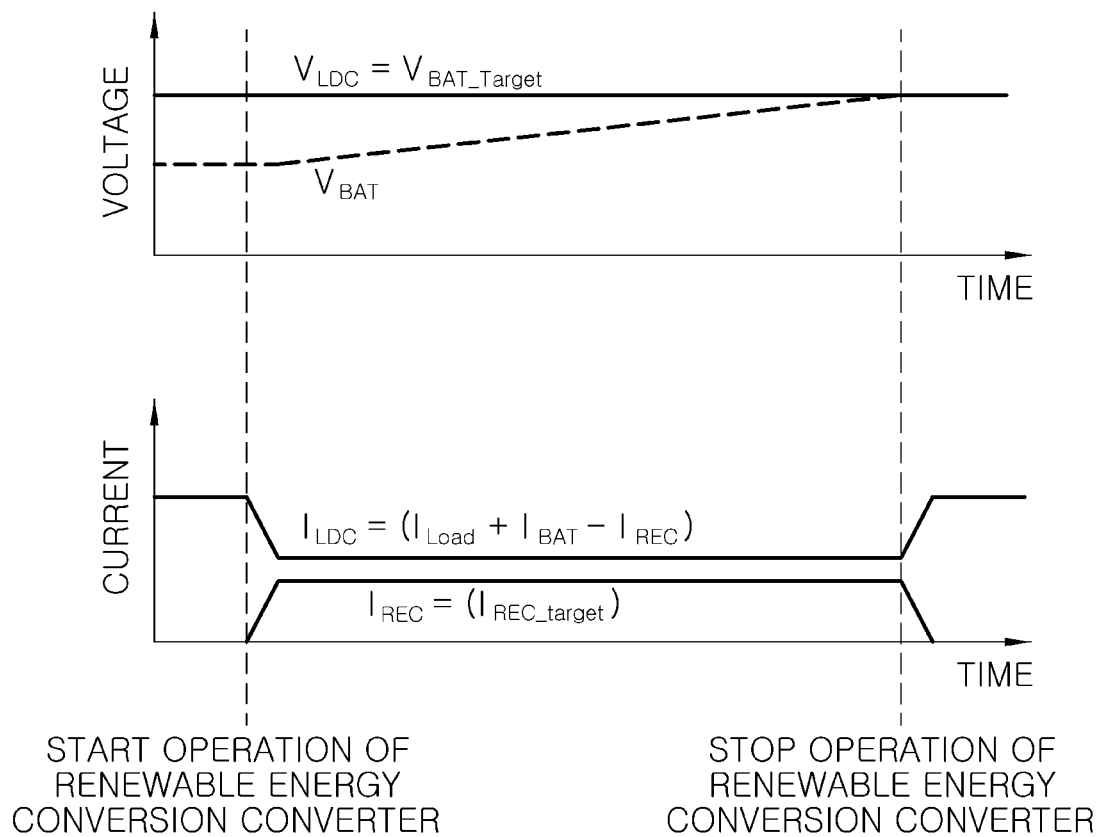
FIG. 6 is a diagram illustrating a case in which an auxiliary battery is charged to a target charging state through the output current of a low-voltage conversion converter and the output current of a renewable energy conversion converter, in an apparatus for controlling a converter of an eco-friendly vehicle according to an embodiment of the present disclosure.

FIG. 6 is a diagram illustrating a case in which the auxiliary battery is charged to the target charging state through the output current of the low-voltage conversion converter and the output current of the renewable energy conversion converter, in the apparatus for controlling the converter of the eco-friendly vehicle according to an embodiment of the present disclosure. Referring to FIG. 6, when the output of the low-voltage conversion converter 200 reaches the open circuit voltage corresponding to the target charging state of the auxiliary battery, the controller 500 may cause the output current of the renewable energy conversion converter 400 to reach the target output current, and may cause the output current of the low-voltage conversion converter 200 and the output current of the renewable energy conversion converter 400 to be simultaneously provided to the auxiliary battery until the auxiliary battery 800 reaches the target charging state. As described above, in the present disclosure as illustrated in FIG. 6, the power generated from the renewable energy generator 300 may be converted through the renewable energy conversion converter 400 to be used to charge the auxiliary battery 800, and the output current of the low-voltage conversion converter 200 may be reduced by the output current of the renewable energy conversion converter 400, thereby further improving the fuel efficiency of the vehicle.

In FIG. 6, $V_{LDC}$ denotes an output voltage of the low-voltage conversion converter, $V_{BAT\_TARGET}$ denotes an open circuit voltage corresponding to a target charging state of the auxiliary battery, $V_{BAT}$ denotes a voltage of the auxiliary battery, $I_{LDC}$ denotes an output current of the low-voltage conversion converter, $I_{BAT}$ denotes a current applied to an auxiliary battery, $I_{LOAD}$ denotes a current applied to an electric load, $I_Rc$ denotes an output current of the renewable energy conversion converter, and $I_{REC\_TARGET}$ denotes a target output current of the renewable energy conversion converter.

In addition, the controller 500 may stop the operation of the renewable energy conversion converter 400 after the auxiliary battery reaches the target charging state.

The controller 500 may operate at least one of the low-voltage conversion converter 200 and the renewable energy conversion converter 400 while the vehicle is stopped or traveling. That is, according to the embodiment, the controller 500 may operate only the renewable energy conversion converter 400 during the stop of the vehicle, and according to another embodiment, may simultaneously operate the low-voltage conversion converter 200 and the renewable energy conversion converter 400 during the stopping of the vehicle. Here, operating the renewable energy conversion converter 400 may mean that the power generated from the renewable energy generator 300 is used, and operating the low-voltage conversion converter 200 may mean that the power provided from the high-voltage battery 100 is used. In addition, the controller 550 may simultaneously operate the low-voltage conversion converter 200 and the renewable energy conversion converter 400 even while the vehicle is traveling.

Figure 7:
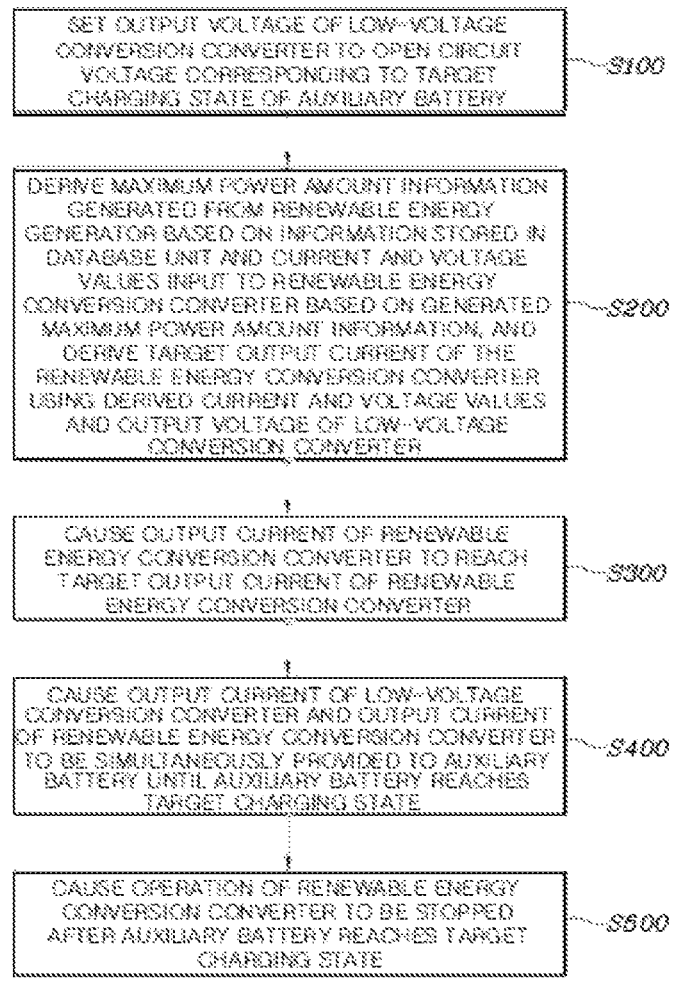
FIG. 7 is a flowchart illustrating a method for controlling a converter of an eco-friendly vehicle according to an embodiment of the present disclosure.

FIG. 7 is a flowchart illustrating a method for controlling a converter of an eco-friendly vehicle according to an embodiment of the present disclosure. As illustrated in FIG. 7, the method for controlling the converter of the eco-friendly vehicle according to an embodiment of the present disclosure may include setting an output voltage of a low-voltage conversion converter to an open circuit voltage corresponding to a target charging state of an auxiliary battery, deriving maximum power amount information generated from a renewable energy generator based on information stored in a database and current and voltage values input to a renewable energy conversion converter based on the generated maximum power amount information and deriving a target output current of the renewable energy conversion converter using the derived current and voltage values and the output voltage value of the low-voltage conversion converter, and causing an output current of the renewable energy conversion converter to reach the target output current of the renewable energy conversion converter. The method for controlling the converter of the eco-friendly vehicle according to an embodiment of the present disclosure may further include causing an output current of the low-voltage conversion converter and the output current of the renewable energy conversion converter to be simultaneously provided to the auxiliary battery until the auxiliary battery reaches the target charging state, and causing an operation of the renewable energy conversion converter to be stopped after the auxiliary battery reaches the target charging state. In the method for controlling the converter of the eco-friendly vehicle according to the present disclosure, detailed description of the operations performed by the controller are the same as the detailed description of the controller of the above-described method for controlling the converter of the eco-friendly vehicle, and thus will be omitted.

What is claimed is:

1. An apparatus for controlling a converter of an eco-friendly vehicle, the apparatus comprising:
    a high-voltage battery;
    a low-voltage conversion converter configured to convert power supplied from the high-voltage battery into a low voltage to provide power to at least one of an auxiliary battery of the vehicle or an electric load of the vehicle;
    a renewable energy generator configured to generate power using renewable energy including solar light;
    a renewable energy conversion converter configured to convert the power supplied from the renewable energy generator to provide power to the at least one of the auxiliary battery and the electric load;
    a controller configured to control an output voltage value of the low-voltage conversion converter and an output current of the renewable energy conversion converter; and
    a database configured to store open circuit voltage information for each charging state of the auxiliary battery and power information generated from the renewable energy generator,
    wherein the controller derives maximum power amount information generated from the renewable energy generator based on the power information stored in the database, derives current and voltage values input to the renewable energy conversion converter based on the maximum power amount information, and derives a target output current of the renewable energy conversion converter using the derived current and voltage values and the output voltage value of the low-voltage conversion converter,
    wherein the controller derives the maximum power amount information generated from the renewable energy generator when the controller controls the output voltage value of the low-voltage conversion converter to be an open circuit voltage of a target charging state of the auxiliary battery stored in the database based on the open circuit voltage information stored in the database.

2. The apparatus according to claim 1, wherein the controller increases the output current of the renewable energy conversion converter to reach the target output current of the renewable energy conversion converter.

3. The apparatus according to claim 1, wherein the controller operates at least one of the low-voltage conversion converter and the renewable energy conversion converter during stopping or traveling of the vehicle.

4. The apparatus according to claim 1, wherein the controller simultaneously provides an output current of the low-voltage conversion converter and the output current of the renewable energy conversion converter to the auxiliary battery until the auxiliary battery reaches the target charging state.

5. The apparatus according to claim 4, wherein the controller ends an operation of the renewable energy conversion converter after the auxiliary battery reaches the target charging state.

6. A method for controlling a converter of an eco-friendly vehicle, the method comprising:
    setting an output voltage value of a low-voltage conversion converter to an open circuit voltage corresponding to a target charging state of an auxiliary battery;
    deriving maximum power amount information generated from a renewable energy generator based on information stored in a database;
    deriving current and voltage values input to a renewable energy conversion converter based on the maximum power amount information;
    deriving a target output current of the renewable energy conversion converter using the derived current and voltage values and the output voltage value of the low-voltage conversion converter; and increasing an output current of the renewable energy conversion converter to reach the target output current of the renewable energy conversion converter, wherein the database is configured to store open circuit voltage information for each charging state of the auxiliary battery and power information generated from the renewable energy generator, and wherein the deriving maximum power amount information comprises deriving the maximum power amount information generated from the renewable energy generator when the output voltage value of the low-voltage conversion converter becomes the open circuit voltage of the target charging state of the auxiliary battery stored in the database based on the open circuit voltage information stored in the database.

7. The method according to claim 6, further comprising:

supplying an output current of the low-voltage conversion converter and the output current of the renewable energy conversion converter, simultaneously, to the auxiliary battery until the auxiliary battery reaches the target charging state; and stopping an operation of the renewable energy conversion converter after the auxiliary battery reaches the target charging state.

* * * * *